Dec. 14, 1943.  D. L. CHANDLER ET AL  2,336,530
FLOATING DRIVE MECHANISM FOR AUTOMOBILE DOOR WINDOWS
Filed May 5, 1941  4 Sheets-Sheet 1

Dec. 14, 1943. D. L. CHANDLER ET AL 2,336,530
FLOATING DRIVE MECHANISM FOR AUTOMOBILE DOOR WINDOWS
Filed May 5, 1941 4 Sheets-Sheet 3

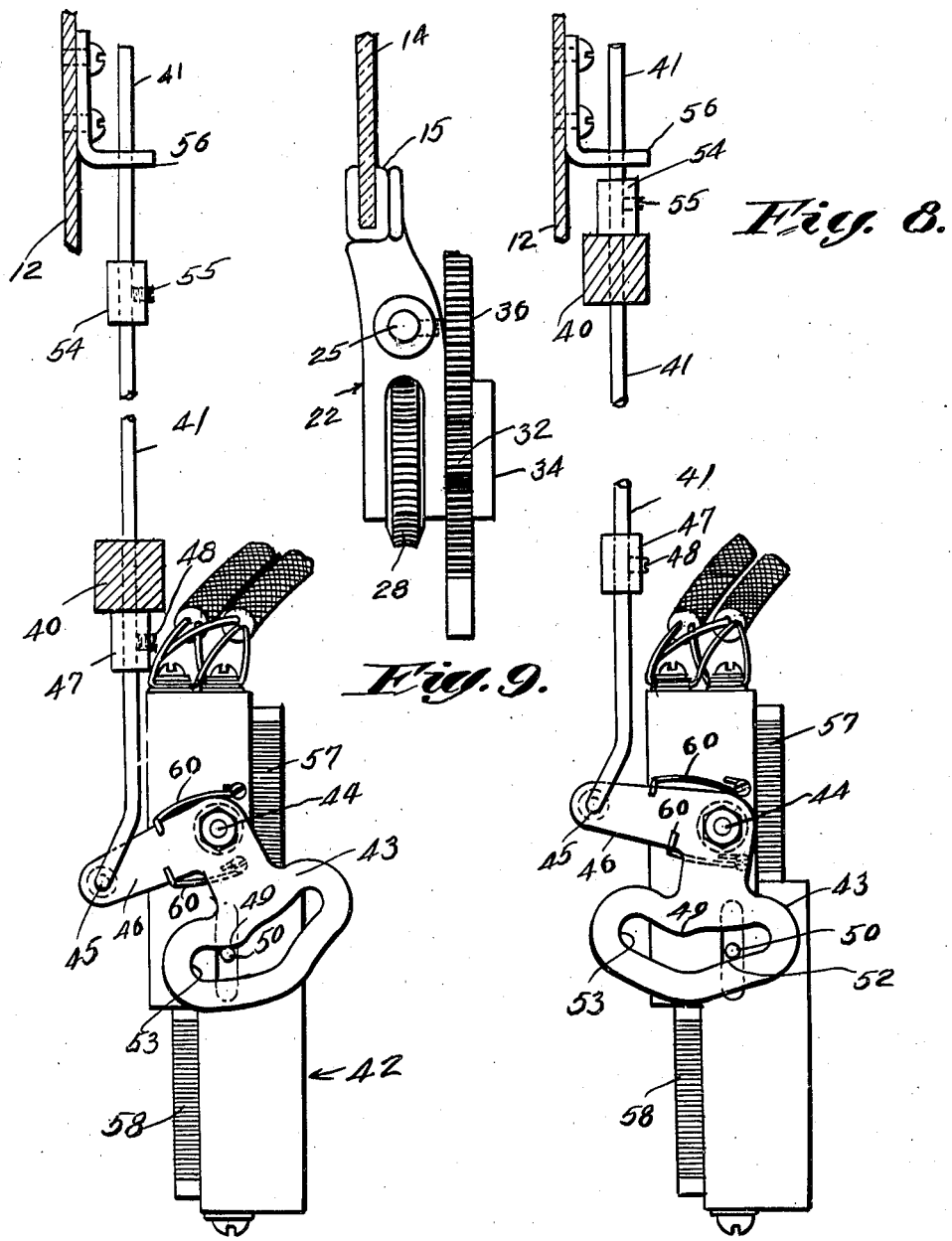

Patented Dec. 14, 1943

2,336,530

UNITED STATES PATENT OFFICE 2,336,530

FLOATING DRIVE MECHANISM FOR AUTOMOBILE DOOR WINDOWS

Daniel L. Chandler and Frank H. Walker, Salem, and George W. Ewing, Peabody, Mass., assignors to Aresee Company Inc., Salem, Mass., a corporation of Massachusetts Application May 5, 1941, Serial No. 391,886

1 Claim. (Cl. 268—124)

Our present invention relates to raising and lowering mechanism for automobile door windows in which the window pane is operated up and down electrically, and more particularly in which the electrical motor and driving members are mounted on the traveling window pane mounting.

Automobile doors present a different problem over other doors and structures in which sliding window panes are used in conjunction with automatic or electrical driving mechanisms. It is a well known fact that automobiles are subjected to many and numerous shocks produced from uneven roadways and continuous vibration when in motion. In addition to this road-produced shock and vibration, doors and windows have to withstand the additional shock produced from the slamming of the doors by thoughtless operators and others who are in too much of a hurry to close the doors properly. In many instances the shock produced from slamming of the doors results in the breakage of the window panes. In modern automobile door design many manufacturers go to considerable trouble and expense to provide window pane mountings and slide-ways that are to some extent shock yielding the glass window pane traveling in felt protected slideways and bearing surfaces so that the shock occurring from the slamming of the door will be reduced to a minimum as far as the glass is concerned.

It will readily be apparent that any apparatus which is introduced into the mechanism of an automobile door must of necessity be of a more delicate construction than the conventional hand-crank type but at the same time it is subjected to shocks and jars common to this kind of window construction, and to be practical and useful, such mechanisms must withstand this kind of shock. In our present invention, it will be noted that we have provided a driving mechanism, the moving parts of which are carried on the window pane mounting and therefore take advantage of the shock-cushioning construction provided for the window pane.

Therefore, the principal object of our invention is an improved electrically driven floating mechanism for automobile doors;

Another object is an improved electrical drive mechanism carried in the moving window pane mounting in an automobile door;

Still another object in electrically driven automobile door windows is the location of the electrical control switch on the hinged side of the door which comprises the area of least shock when the door is slammed, and Other objects and novel features comprising the construction and operation of our invention will appear as the description of the apparatus progresses.

In the drawings illustrating the preferred embodiment of our invention,

Fig. 4 is a cross-section taken on the line 4—4 of Fig. 1, the upper portions of the glass window pane and the rack being broken off for convenience;

Fig. 5 is another cross-section similar to Fig. 4 but looking in the opposite direction, and indicated at 5—5 on Fig. 1, portions of the glass window pane and the rack being broken away;

Fig. 6 is a cross-section taken on the line 6—6 of Fig. 1, the upper portion of the glass window pane being broken away;

Fig. 7 is a fragmentary cross-section taken on the line 7—7 of Fig. 1 showing the electrical switch in the off position as actuated by the sliding window apparatus;

Fig. 8 is another fragmentary cross-section similar to Fig. 7 but showing the electrical switch in the off position when the window pane is in the high position, as shown in Fig. 2, and Fig. 9 is a cross-section taken on the line 9—9 of Fig. 1 showing an end elevation of the forward driving housing and drive gears, the upper portion of the glass window pane being broken off for convenience.

Figure 1:
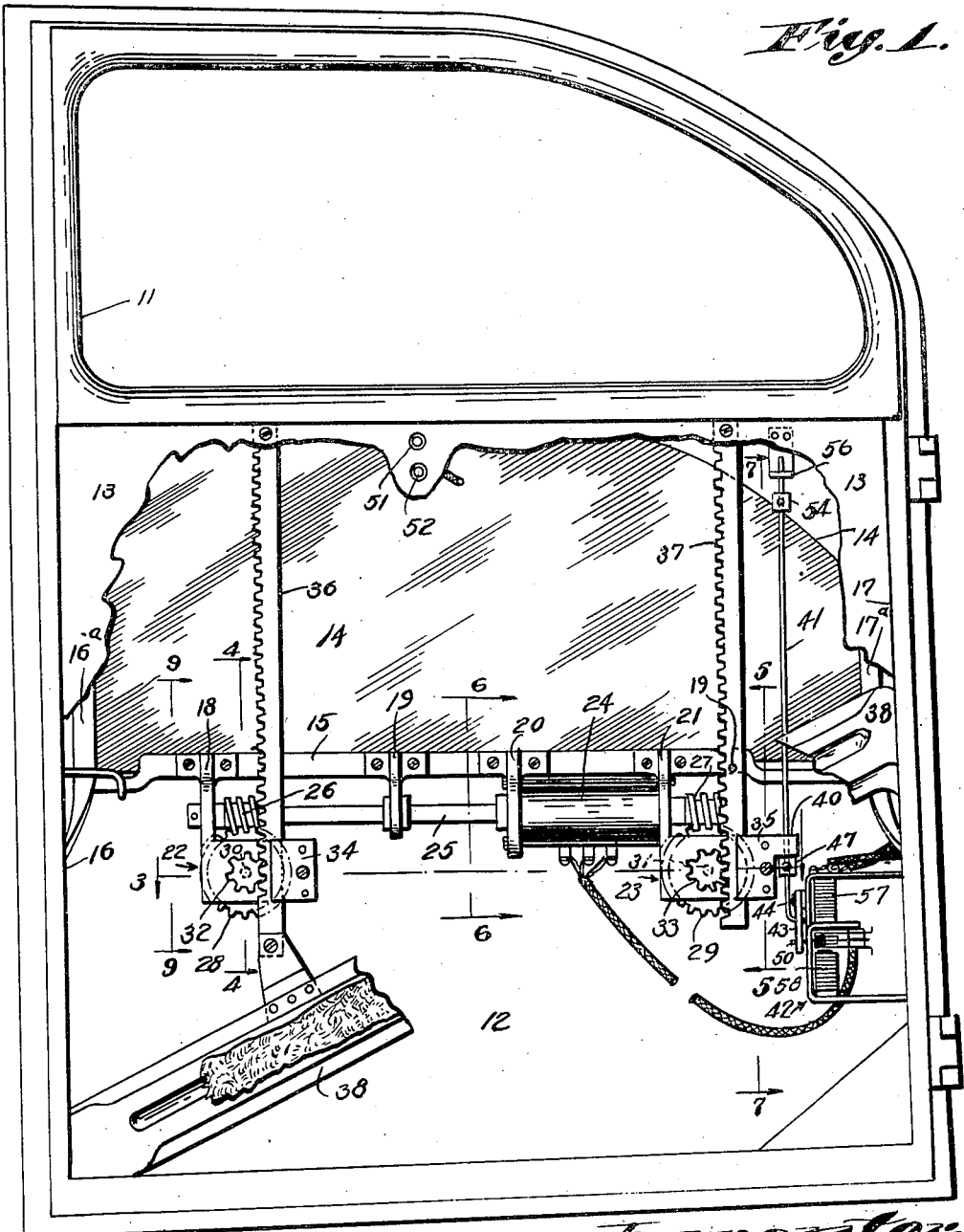
Fig. 1 is an inside elevation of an automobile door portions of which have been cut away to better show the arrangement and construction of our apparatus, as applied to the door window frame and the door window pane.

Referring more in detail to the drawings, 10 indicates an automobile door frame having the usual window opening 11. 12 indicates the outer door panel, the inside door panel 13 having been broken away for the purpose of disclosing the internal mechanism of the door.

In side of the front and back door panels 12 and 13 respectively is located the traveling window pane 14, the bottom edge of which is provided with a channel member 15. Attached to the inside of the front and rear door frames 16 and 17 are slide-ways 16a and 17a adapted to receive the vertical edges of the window pane 14.

Attached to the window pane channel member 15 are bracket members 18, 19, 20 and 21. The forward bracket 18 carries the forward gear housing 22 which is similar to the rear gear housing 23 carried by the bracket 21. Located between the brackets 20 and 21 is a reversible motor 24 the armature shaft 25 of which is provided at each end with worms 26 and 27 both driving in the same direction. The armature shaft 25 is supported through the brackets 18, 19, 20 and 21.

Figure 3:
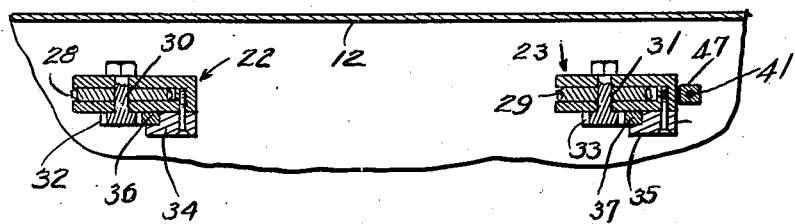
Fig. 3 is a fragmentary cross-section taken on the line 3—3 of Fig. 1.
Figure 3:
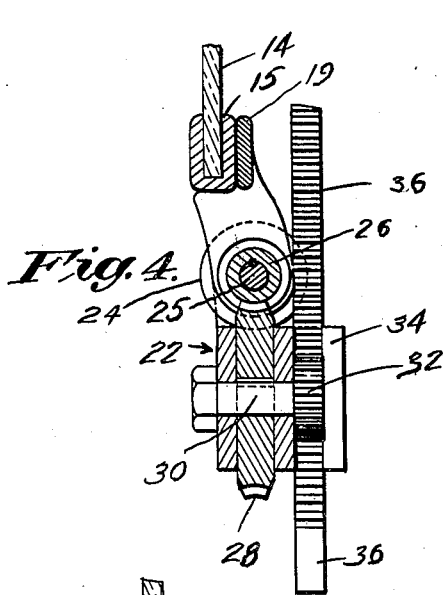
Figure 3:
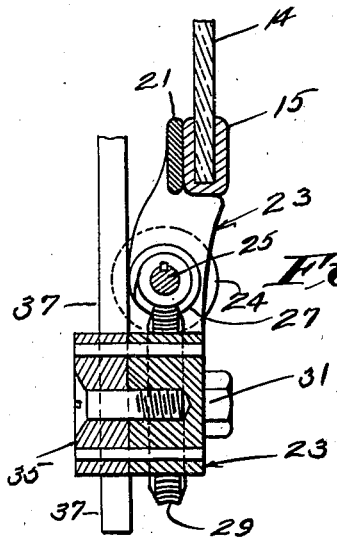
Figure 3:
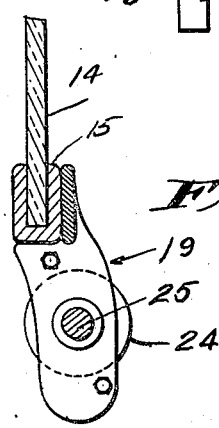

The gear housings 23 are shown in cross-section in Fig. 3 and again in a larger scale in Figs. 4 and 5, the front end being shown in elevation in Fig. 9.

The body of the housings 23 provides a bearing for the worm gear which is engaged with the worms 26 and 27, as indicated at 28 and 29. The shafts 30 and 31 are provided on the front sides with pinions 32 and 33. Slide-way members 34 and 35 are mounted on the gear housing 23 and are adapted to receive the racks 36 and 37. The forward rack 36 is attached at its upper end to the inside door panel member 13, the lower end being attached to the transverse supporting member 39. The other rack 37 is also attached at its upper end to the inside door panel 13, the lower portion being attached to the supporting member 38 by means of the bolt 39 shown in cross-section, the surrounding portion of the supporting member having been cut away for the sake of clarity.

The slide-way member 35 on the gear housing 23 is provided with an extension portion 40 through which slides the rod 41.

Mounted on the hinge side of the door is the electric switch 42 which is provided with a cam member 43 which is pivoted at 44 to the forward side of the switch frame. The lower end of the rod 41 is pivoted at 45 to the arm 46 of the cam member 42 so that when the rod 41 is pulled up or down the cam 43 will swing on the pivot 44 to one side or the other, as the case may be. A lower stop member 47 is fixed to the rod 41 by means of the set screw 48 so that when the window pane 14 reaches its lowermost position, the extension portion 40 located on the slide-way member 35 engages the stop member 47 pulling the rod 41 down. In this position, the cam 43 swings to the right, as shown in Fig. 7, causing the cam surface 49 to engage the pin 50 and draw it down into the position shown in Fig. 7. When the pin 49 of the switch 42 is in the central position, as shown in Fig. 7, the electrical circuit to the reversible motor 24 is opened and the window pane 14 stops having reached its lowermost position.

The push buttons 51 and 52 located on the inside panel 13 control the switch 42. When the button 52 is pushed the pin 50 in the electrical switch 42 drops down in the open path 53 of the cam 43 and the electrical motor 24 operates in a reverse direction rotating the shaft 25, gears 28 and 29, and pinions 32 and 33 thereby lifting the window pane 14 in the door. This of course is due to the fact that the pinions 32 and 33 travel upwardly on the racks 36 and 37, the racks being stationary.

As the window pane moves upwardly, the extension portion 40 on the rod 41 slides up on the said rod until it engages under the stop member 54 which is secured to the rod 41 by means of the set-screw 55. When the member 40 engages the stop member 54 the rod 41 rises and pivots the cam member 43 swinging it into the position shown in Fig. 8. In this position, the pin 50 of the switch 42 has been raised to the same central position shown in Fig. 7 which again opens the electrical circuit to the motor 24 thereby stopping the movement of the window pane 14.

The upper end of the rod 41 is slidably journalled in the bracket member which may be attached to the front panel portion 12 or the inside panel 13 and acts as a guiding medium therefor.

The electrical switch 42 is controlled by means of solenoids 57 and 58 which control the operation of the pin 50 and is not directly concerned with the present application except as its operation is connected with the window raising and lowering mechanism.

It may however be pointed out that when the window raising and lowering mechanism has reached its maximum limit of movement in either direction, the cam 43 has not only opened the electrical circuit but prevents the operator from continuing in the direction representing the maximum limit of travel however, at such a point, the operator may reverse the electrical switch and move the window in an opposite direction. When the window has reached its maximum limit of travel in the reverse direction, the electrical circuit is again opened by the cam 43 and further movement of the window in this direction is prevented but the electrical circuit may be reversed by the switch to move the window in the other direction.

Figure 2:
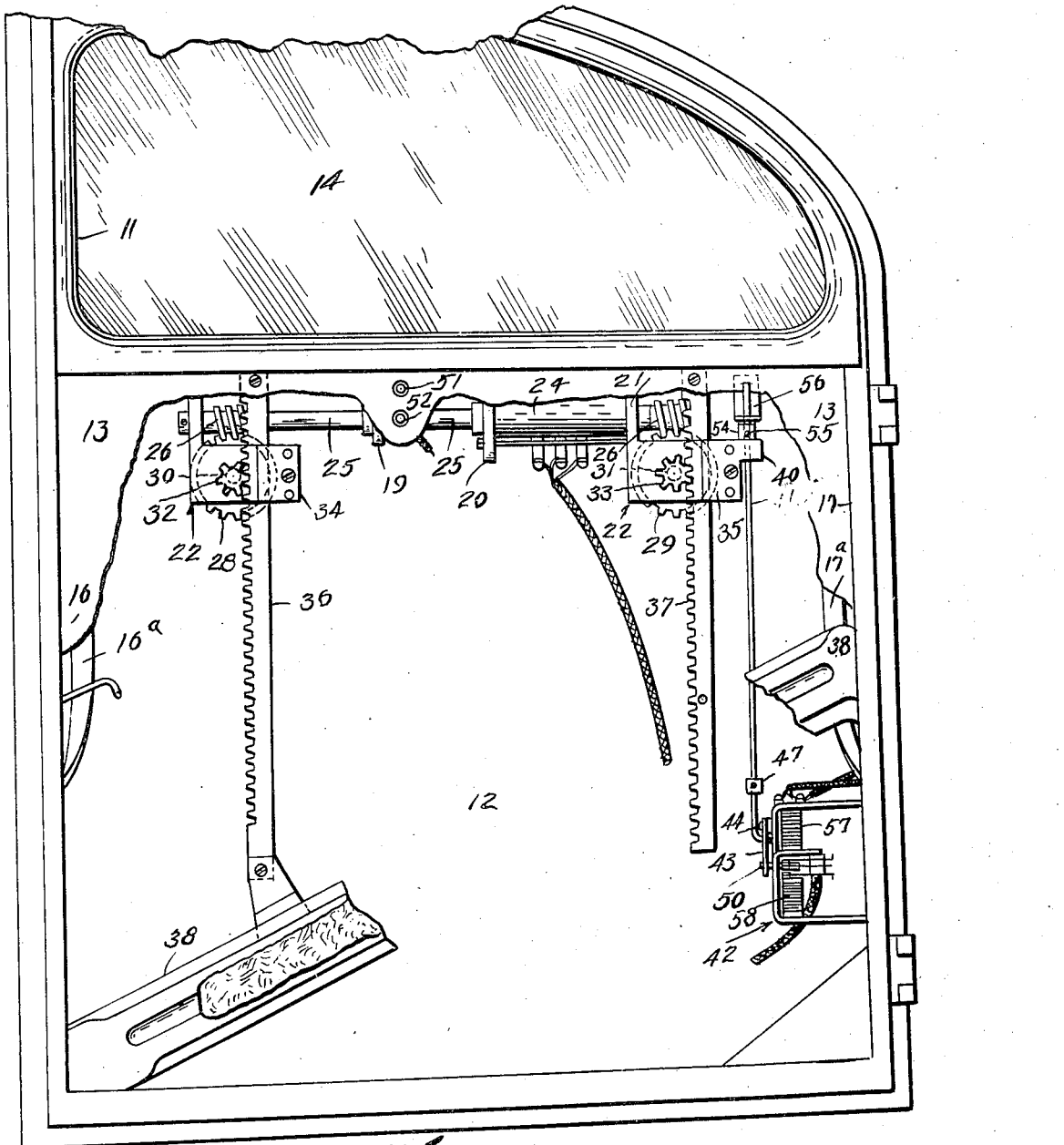
Fig. 2 is another inside elevation of the same door showing the window pane raised from the lowermost position, as viewed in Fig. 1, to the highest position, portions of the door being broken away for convenience in illustrating same.

In other words, in the position of the cam 43, as shown in Fig. 7, the electrical motor 24 cannot be operated to carry the window pane 14 lower because the switch pin 50 is prevented from raising against the cam surface 49. When the window pane 14 is raised to its limit, as shown in Fig. 2, the pin 50 cannot drop down because of the cam surface 59 of the cam 42 but the pin 50 may move upwardly in the cam area 53 which is the direction it takes when the solenoid 57 is energized at which time the electrical motor 24 operates to lower the window.

When the window pane is midway between top and bottom, the member 40 is not in contact with either of the stop members 47 or 55. In such position the cam 43 is free and the springs 60 center the cam midway between the position shown in Fig. 7 and that shown in Fig. 8. In this position the pin 50 which is operated by the solenoids 57 and 58 is free to move in a vertical direction thereby operating the motor 24 either in a lifting or a lowering motion with respect to the window pane 14.

Having thus described our invention what we claim as new is:

An improved electrical operator for automobile door windows and the like comprising in combination, the said door having a frame, inside and outside panels, and a vertically slidable window pane, a channel member attached to the lower edge of said window pane, brackets attached to said channel, a reversible electrical motor located between two of said brackets, an armature shaft extending through said motor and said brackets in parallel relation with said channel, vertical racks mounted on the inside of said inside door panel, a gear housing attached to the two end brackets, a worm gear and a pinion gear journalled to said housing, the said pinion gear of each housing engaging with one of said racks, the said worm gear engaging with a worm engaged with said armature shaft adjacent each housing, an electrical solenoid operated switch attached to the hinge side of said door and having a vertically disposed switch cam rod connecting with one of said gear housing members, stops located on said rod, one of said stop members being located above said housing member and the other stop member being located below said housing.

DANIEL L. CHANDLER.
FRANK H. WALKER.
GEORGE W. EWING.